July 6, 1926.  
D. H. TAYLOR  
1,591,894
DEVICE FOR POSITIONING PACKING IN STUFFING BOXES AND THE LIKE
Filed July 22, 1925
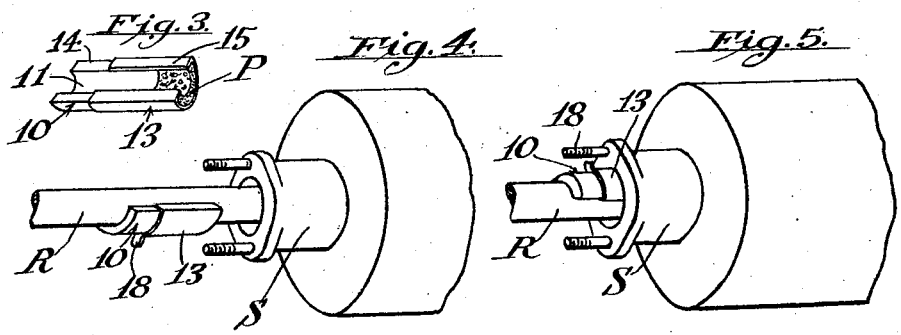
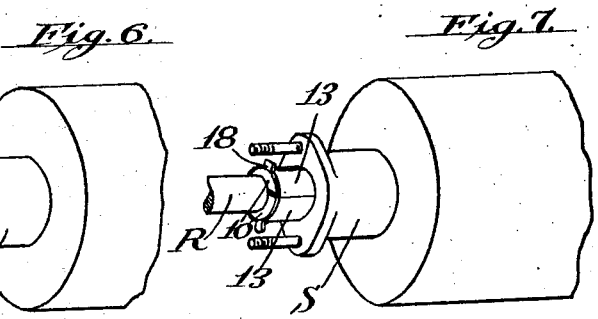
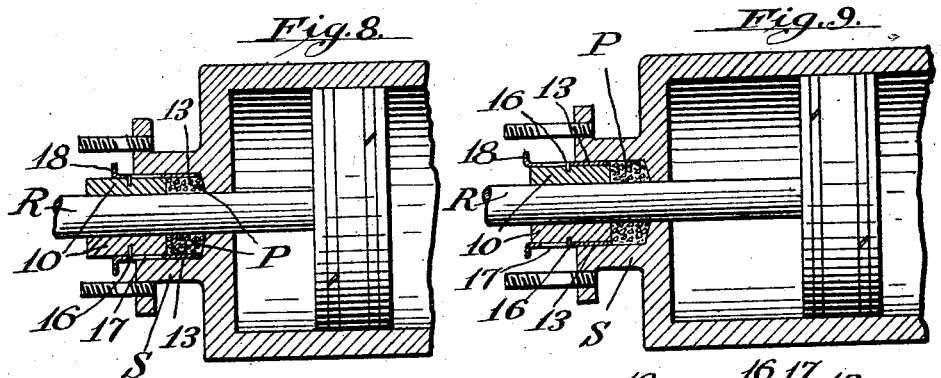
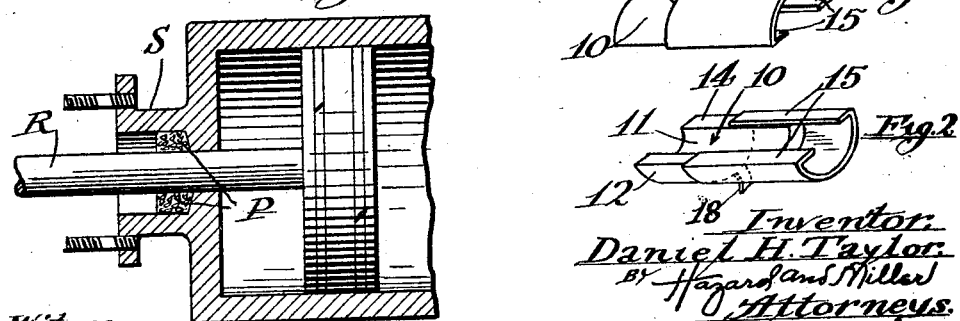
Inventor:
Daniel H. Taylor Patented July 6, 1926.

1,591,894

UNITED STATES PATENT OFFICE.

DANIEL H. TAYLOR, OF LOS ANGELES, CALIFORNIA.

DEVICE FOR POSITIONING PACKING IN STUFFING BOXES AND THE LIKE.

Application filed July 22, 1925. Serial No. 45,311.

This invention relates to improvements in devices for positioning plastic packing in stuffing boxes and the like.

An object of the invention is to provide an improved device whereby plastic packing can be easily and quickly placed in a stuffing box about a rod or shaft extending therethrough, so that the ring of packing about the shaft will be uniform and may be tightly compressed thereabout. By the improved form of device, loose or bulk packing can be employed, eliminating the use of fabric receptacles or tubes heretofore employed, which are disadvantageous because of the fact that the fabric is allowed to remain in the stuffing box.

With the foregoing and other objects in view which will be made manifest in the following detailed description and specifically pointed out in the appended claims, reference is had to the accompanying drawings for an illustrative embodiment of the invention, wherein:

Figures 1 and 2 are perspective views of the two complementary parts which cooperate to form the improved packing positioning device, Fig. 3 is a perspective view illustrating one of the complementary parts after having been filled with packing preparatory to being inserted in the stuffing box, Fig. 4 is a perspective view of a conventional type of stuffing box with the first part of the device about to be placed therein, Fig. 5 is a similar view showing the first part as having been applied, Fig. 6 illustrates the complete device as having been inserted in the stuffing box, Fig. 7 is a view somewhat similar to Fig. 6, illustrating the position of the device during which the packing is being packed in the stuffing box, Figs. 8 and 9 are vertical sections through Figs. 6 and 7, and Fig. 10 is a vertical section through the stuffing box after the device has been removed, leaving the packing therein.

Referring to the accompanying drawings wherein similar reference characters designate similar parts throughout, the improved packing positioning device consists of two complementary parts, as shown in Figs. 1 and 2. Each part consists of a semi-cylindrical member 10 having a semi-cylindrical interior surface 11 which is concentric with respect to the exterior surface 12. Against the exterior surface 12 of the member 10 there is positioned a sheath 13 which is preferably formed of sheet metal or the like, and which slides upon the exterior surface 12. The side edges of the sheath 13 are bent over against the faces 14 on the member 10, as indicated at 15. The sheath 13 is so slidable upon the member 10 that it may be extended beyond an end of the member, as illustrated in Fig. 8, or the end edges of the sheath 13 may be caused to assume a position even with the end of the member 10, as shown in Fig. 9. These positions of the sheath 13 on the member are determined by a pin 16 on the back of the member, which extends through a slot 17 formed in the sheath, it being readily understood that the pin 16 slides within the slot, and thus limits the sliding movement of the sheath on the member 10. The opposite edge of each sheath is provided with a lug 18 which is bent upwardly so as to constitute a finger grip.

The improved device is used in the following manner: One of the parts is manipulated so that the sheath 13 assumes its extended position, as shown in Fig. 3, and a plastic packing P of any desired kind is placed on the extended end of the sheath beneath the side edges 15 and between the end of the sheath and the end of the member 10. The member 10 is then placed against the under side of the rod R, which may be a plunger rod or a rotating shaft or the like, and while in this position, it is caused to slide into the stuffing box S. When it has entered the stuffing box, it is swung around therein so as to be positioned on top of the rod R, as shown in Fig. 5.

The other part of the device is then filled in the same manner with the packing P and is positioned in the stuffing box S below the rod R and beneath the first part, so that the complete device assumes the position in the stuffing box as shown in Fig. 6. In such a position a mechanic packing the stuffing box places his thumbs upon the outer edges of the two members 10 and places his first fingers against the finger grips 18. In this manner he may cause the sheaths 13 to slide outwardly upon their respective members 10, the members 10 remaining stationary during such sliding movement. The device then assumes the position as shown in Fig. 7.

While in this position, a suitable mallet or the like can be caused to strike upon the outer ends of the two members 10, thus causing the packing P to be compressed within the stuffing box about the rod or shaft R. After the packing has been compressed by such hammering within the stuffing box, the two complementary parts, which form the packing positioning device, can be withdrawn from the stuffing box, leaving the ring of packing therein, as shown in Fig. 10, tightly packed about the shaft. The conventional gland, which is not shown, can then be placed over the open end of the stuffing box and tightened thereon.

From the above it will be readily appreciated that the improved device greatly facilitates the positioning of plastic packing within stuffing boxes and similar constructions, and that it is possible to use bulk packing, that is, packing which has not been specially provided in fabric receptacles or tubes. Furthermore, the improved device enables the packing P to be evenly distributed upon the sheath 13 before it enters the stuffing box, so that an even ring of packing will be placed in the stuffing box S about the shaft. It will be obvious that in large stuffing boxes, the two complementary parts of the device can be refilled a second time and again placed in the stuffing box, so that a double or triple quantity of packing can be placed therein, if desired. It is contemplated to make the member 10 in either of a plurality of manners. In some instances it may be formed wholly of metal, wood or fiber. In other instances it may be formed of several parts secured together, or the device may be of a laminated construction so as to withstand the blows of the hammer or mallet.

It is also quite obvious that the improved device is not limited to round stuffing boxes in which there are round shafts or rods. The device can be easily reconstructed so as to position packing in a similar manner about a square plunger rod or the like.

It will be understood that various changes in the detail of construction may be made without departing from the spirit or scope of the invention as defined by the appended claims.

I claim:

1. A device for positioning packing in stuffing boxes and the like comprising two complementary parts, each part consisting of a semi-cylindrical member having a cylindrical interior surface concentric with respect to its cylindrical exterior surface, and a semi-cylindrical sheath slidably mounted against the exterior surface of said member so as to be capable of being extended from one of its ends as and for the purpose described.

2. A device for positioning packing in stuffing boxes and the like comprising two complementary parts, each part consisting of a semi-cylindrical member having a cylindrical interior surface concentric with respect to its cylindrical exterior surface, and a semi-cylindrical sheath slidably mounted against the exterior surface of said member so as to be capable of being extended from one of its ends as and for the purpose described, said sheath having its side edges bent over against the faces of said member.

3. A device for positioning packing in stuffing boxes and the like comprising two complementary parts, each part consisting of a member having an interior surface complementary to the exterior surface of the rod extending through the stuffing box and an exterior surface complementary to the interior surface of the stuffing box, and a sheath positioned against the exterior surface on said member, said sheath being slidable thereon so as to be capable of being extended beyond an end of said member or to be retracted thereon as and for the purpose described.

4. A device for positioning packing in stuffing boxes and the like comprising two complementary parts, each part consisting of a member having an interior surface complementary to the exterior surface of the rod extending through the stuffing box and an exterior surface complementary to the interior surface of the stuffing box, and a sheath positioned against the exterior surface on said member, said sheath being slidable thereon so as to be capable of being extended beyond an end of said member or to be retracted thereon as and for the purpose described, said sheath having its side edges bent against the faces of said member which are adapted to abut the corresponding faces on the complementary part.

5. A device for positioning packing in stuffing boxes and the like comprising two complementary parts, each part consisting of a member having an interior surface complementary to the exterior surface of the rod extending through the stuffing box and an exterior surface complementary to the interior surface of the stuffing box, a sheath positioned against the exterior surface on said member, said sheath being slidable thereon so as to be capable of being extended beyond an end of said member or to be retracted thereon as and for the purpose described, said sheath having its side edges bent against the faces of said member which are adapted to abut the corresponding faces on the complementary part, there being a slot formed in said sheath, and a pin upon said member slidable in said slot.

6. A device for positioning packing in stuffing boxes and the like comprising two complementary parts, each part consisting of a member having an interior surface complementary to the exterior surface of the rod extending through the stuffing box and an exterior surface complementary to the interior surface of the stuffing box, and a sheath positioned against the exterior surface on said member, said sheath being slidable thereon so as to be capable of being extended beyond an end of said member or to be retracted thereon as and for the purpose described, said sheath having its side edges bent against the faces of said member which are adapted to abut the corresponding faces on the complementary part, each sheath being provided with a finger grip substantially as described.

7. A device for positioning packing in stuffing boxes and the like comprising a plurality of complementary parts, each part consisting of a member having an interior surface complementary to the exterior surface of the rod extending through the stuffing box and an exterior surface complementary to the interior surface of the stuffing box, and a sheath positioned against the exterior surface on said member, said sheath being slidable thereon so as to be capable of being extended beyond an end of said member or to be retracted thereon as and for the purpose described.

In testimony whereof I have signed my name to this specification.

DANIEL H. TAYLOR.